R. B. INGELS.
BOLT.
APPLICATION FILED DEC. 28, 1908.
960,938.
Patented June 7, 1910.
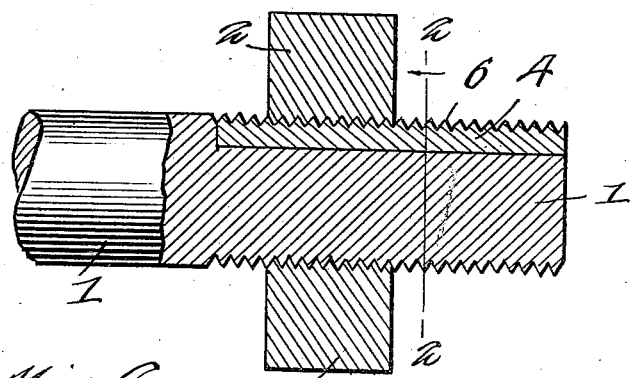
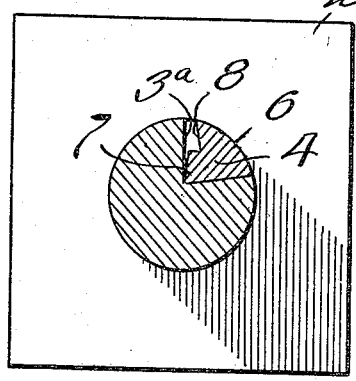
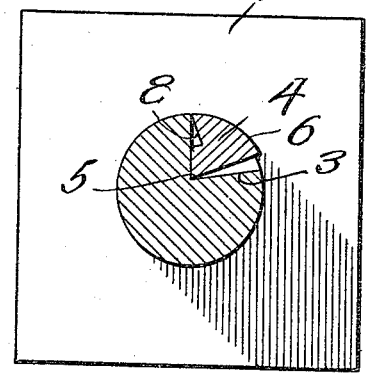
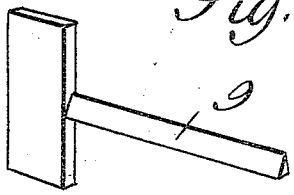
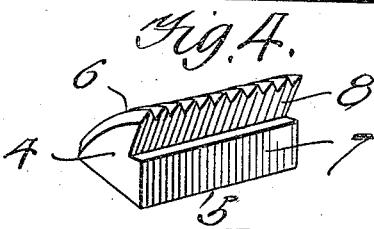
Witnesses
Hugh R. Ott
James A. Koehl
Inventor
Ray Boone Ingels
By Victor J. Evans
Attorney

UNITED STATES PATENT OFFICE.

RAY BOONE INGELS, OF CAPLE, OKLAHOMA.

BOLT.

960,938.  Specification of Letters Patent.  Patented June 7, 1910.

Application filed December 28, 1908.  Serial No. 469,721.

*To all whom it may concern:*

Be it known that I, RAY BOONE INGELS, a citizen of the United States of America, residing at Caple, in the county of Texas and State of Oklahoma, have invented certain new and useful Improvements in Bolts; and I do hereby declare the following to be a full, clear, and exact description of the invention, such as will enable others skilled in the art to which it appertains to make and use the same, reference being had to the accompanying drawings, and to figures of reference marked thereon, which forms part of this specification.

This invention relates to nut locks, and has for an object to provide a simple article of this character wherein novel and effective means are employed for locking the nut to the bolt.

Another object of the invention is to provide the bolt with a movable dog which may be moved into locking engagement with the nut to prevent rotation thereof and to so construct the dog whereby a releasing key can be engaged with the dog to move it into its released position without marring or mutilating the threads of the nut.

In the drawing, forming a portion of this specification and in which like numerals of reference indicate similar parts in the several views:—Figure 1 is a sectional elevation of my improved nut lock. Fig. 2 is a section taken on the line 2—2 of Fig. 1. Fig. 3 is a similar view showing the dog in its engaged position with the nut. Fig. 4 is a detail perspective view of the dog. Fig. 5 is a detail view of the releasing key.

My improved nut lock consists of a bolt 1 having an exteriorly threaded portion for receiving the nut 2. The threaded portion of the bolt is interrupted by a longitudinally extending recess 3 which is of substantially V-form in transverse section. A locking dog 4 is movable in the recess formed in the bolt and in transverse section the said dog conforms substantially with the shape of the recess formed in the bolt. The reduced portion 5 of the locking dog is mounted in the recess in the bolt at the point of intersection of the walls thereof, the said walls at the just named point acting as a fulcrum for the dog on which it may be rocked for a purpose to be hereinafter described.

The locking dog is formed with an arcuate face 6 which is threaded, as shown. The face 7 of the locking dog is formed adjacent to the arcuate surface 6 with a recess 8 which is arranged in opposing relation with respect to the wall 3ª of the recess formed in the bolt. The construction of the nut lock as set forth in the foregoing is such that the nut may be adjusted on the bolt as in the usual manner. After the desired adjustment of the nut has been made the nut can be rotated to a slight extent in a reverse direction causing the locking dog to be moved to cause its arcuate surface to lie out of a common plane with the surface of the bolt. In this manner the threaded surface of the dog will be effectively moved into locking engagement with the threads of the nut. When the locking dog 4 is in its locked position as shown in Fig. 3 of the drawing the recess 8 of the face 7 will be closed entirely by the wall 3ª of the recess formed in the nut. For the purpose of conveniently releasing the locking dog from the nut I employ a key as shown in Fig. 5 of the drawing. This key consists of a shank 9 which is of a shape conforming approximately with that of the recess formed in the face 7 of the locking dog and its side faces are adapted to be wedged against the walls 3ª and 8 respectively to move the dog to the position shown in Fig. 2 of the drawing. By constructing the locking dog in the manner hereinbefore set forth it will be appreciated that in the initial insertion of the shank 9 of the releasing key access to the bore of the nut is closed and the locking key when engaged with the dog for the purpose of releasing it from the nut cannot be moved into engagement with the threads of the nut, hence the threads cannot become mutilated or stripped.

I claim:—

A nut lock comprising a bolt having an exteriorly threaded portion, a nut engaged with the threaded portion of the bolt, the said threaded portion of the bolt being interrupted by a longitudinally extending recess, the said recess being of substantially V-form in transverse section, and a locking dog mounted in the recess and free to rock therein, the said dog conforming substantially in transverse section with the shape of the said recess and having its reduced end mounted in the recess at the point of intersection of the walls thereof so that the walls serve as a fulcrum for the dog, said dog having an arcuate threaded face adapted for engagement with the threaded portion of the nut, the said dog being formed adjacent to the arcuate surface with a recess which is arranged in opposing relation with respect to one wall of the said recess and adapted to be closed by the said wall when the dog is in its locked position.

RAY BOONE INGELS.

Witnesses:
MARTHA E. INGELS,
JESSE WILSON.